United States Patent
Li et al.

(10) Patent No.: US 8,237,662 B2
(45) Date of Patent: Aug. 7, 2012

(54) ELECTRONIC DEVICE AND KEYPAD THEREOF

(75) Inventors: Xiong Li, Shenzhen (CN); Yung-Hung Chu, Taipei Hsien (TW); Kim-Yeung Sip, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 435 days.

(21) Appl. No.: 12/501,498

(22) Filed: Jul. 13, 2009

(65) Prior Publication Data
US 2010/0110013 A1    May 6, 2010

(30) Foreign Application Priority Data
Oct. 31, 2008    (CN) .......................... 2008 1 0305323

(51) Int. Cl.
*G06F 3/02* (2006.01)

(52) U.S. Cl. ...... 345/169; 345/168; 345/173; 178/18.01
(58) Field of Classification Search .................. 345/169, 345/173, 168; 178/18.01; 455/575.1; 341/22
See application file for complete search history.

(56) References Cited

U.S. PATENT DOCUMENTS

| | | | | |
|---|---|---|---|---|
| 6,492,978 | B1 * | 12/2002 | Selig et al. | 345/173 |
| 7,768,504 | B2 * | 8/2010 | Rosenberg et al. | 345/173 |
| 7,800,587 | B2 * | 9/2010 | Kato | 345/168 |

* cited by examiner

*Primary Examiner* — Abbas Abdulselam
(74) *Attorney, Agent, or Firm* — Altis Law Group, Inc.

(57) ABSTRACT

An electronic device includes a keypad, and a body having a touch screen. The keypad attached to the touch screen, includes an obverse surface and a reverse surface. A protrusion is protruded from the obverse surface and is configured to receive user input operation, an attaching member is mounted on the reverse surface and is configured to attach the keypad to the touch screen, a hollow portion is defined in the reserve surface corresponding to the protrusion, and a pressing member is mounted in the hollow portion and is configured for touching the touch screen when the protrusion is pressed.

9 Claims, 6 Drawing Sheets

ELECTRONIC DEVICE AND KEYPAD THEREOF

BACKGROUND

1. Technical Field

The disclosure relates to keypads and, more particularly, to a keypad used in an electronic device having a touch screen.

2. Description of Related Art

Touch screens are widely used in portable electronic devices, such as, mobile phones. Many mobile phones have a touch screen as the only input unit, and users can input commands using the touch screen. However, touch screens are slippery, which can be a problem for users trying to input commands quickly such as when playing a game. Therefore, what is needed is an electronic device having a keypad to solve the above-mentioned problem.

BRIEF DESCRIPTION OF THE DRAWINGS

The components of the drawings are not necessarily drawn to scale, the emphasis instead being placed upon clearly illustrating the principles of the keypad. Moreover, in the drawings, like reference numerals designate corresponding parts throughout several views.

DETAILED DESCRIPTION

Figure 1:
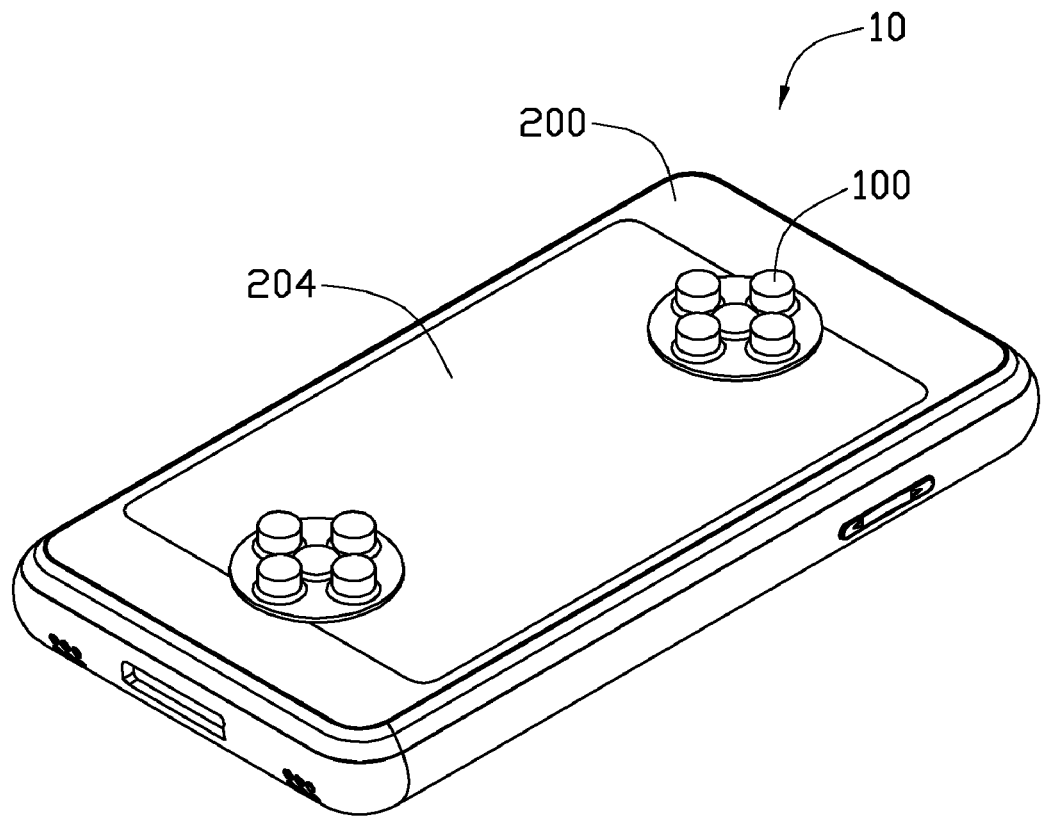
FIG. 1 is a perspective view of an electronic device in accordance with an exemplary embodiment.
Figure 2:
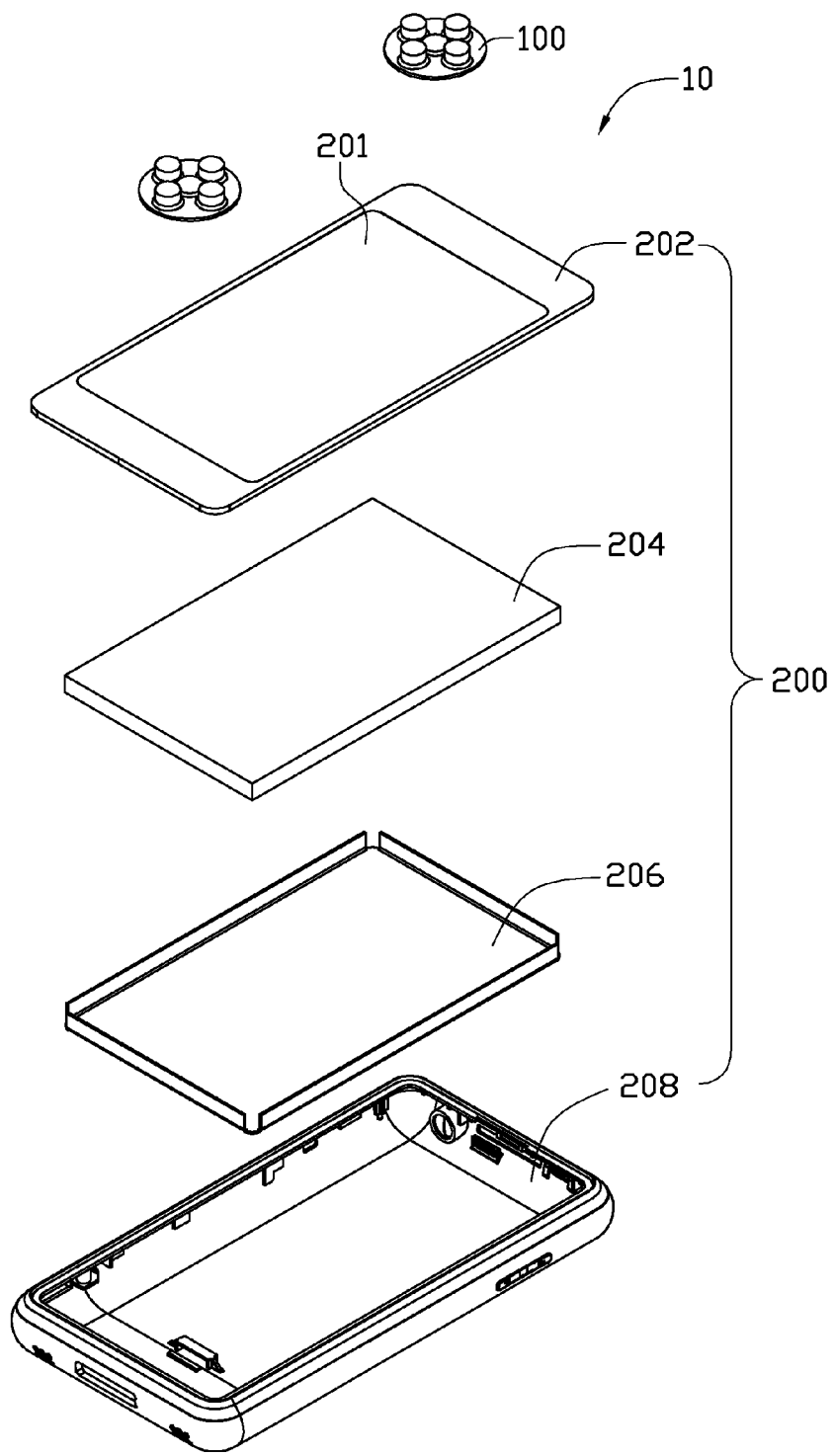
FIG. 2 is an exploded view of an electronic device shown in FIG. 1.

FIG. 1 is a perspective view of an electronic device 10 in accordance with an exemplary embodiment. FIG. 2 is an exploded view of the electronic device 10 shown in FIG. 1. The electronic device 10 includes at least one keypad 100, and a body 200 having a touch screen 204. The keypad 100 is attached on the touch screen 204 of the body 200 using suction and is configured for receiving user input operations.

The body 200 includes a cover 202 defining an opening 201, a touch screen 204, a receiving portion 206, and a housing 208. The cover 202 is engaged with the housing 208. The size of the opening 201 is generally equal to the size of the touch screen 204. The receiving portion 206 is configured to hold the touch screen 204 and is received in the housing 208. Additionally, the housing 208 further includes a circuit board (not shown), the screen 204 is electrically connected to the circuit board.

Figure 3:
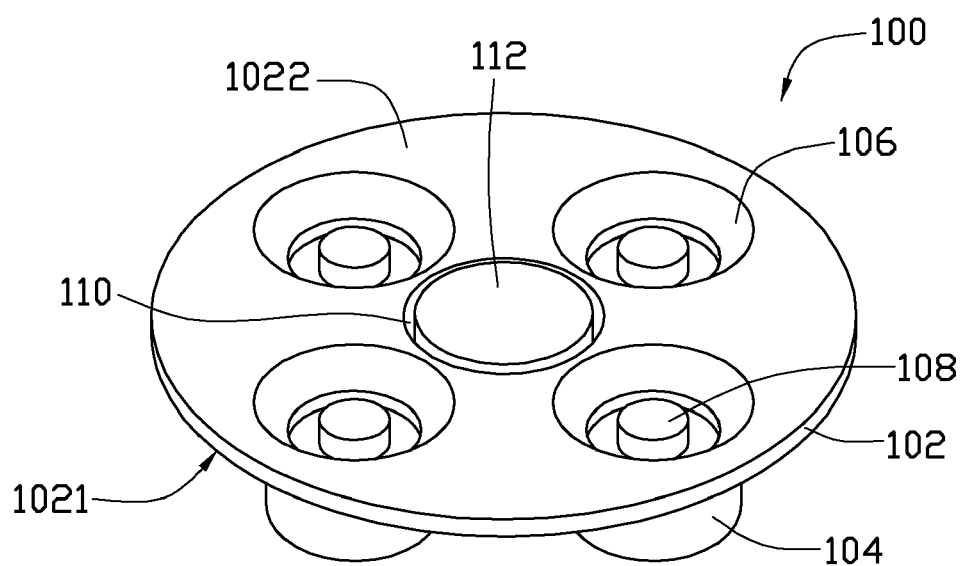
FIG. 3 is a reverse view of a keypad of the electronic device of FIG. 1.
Figure 4:
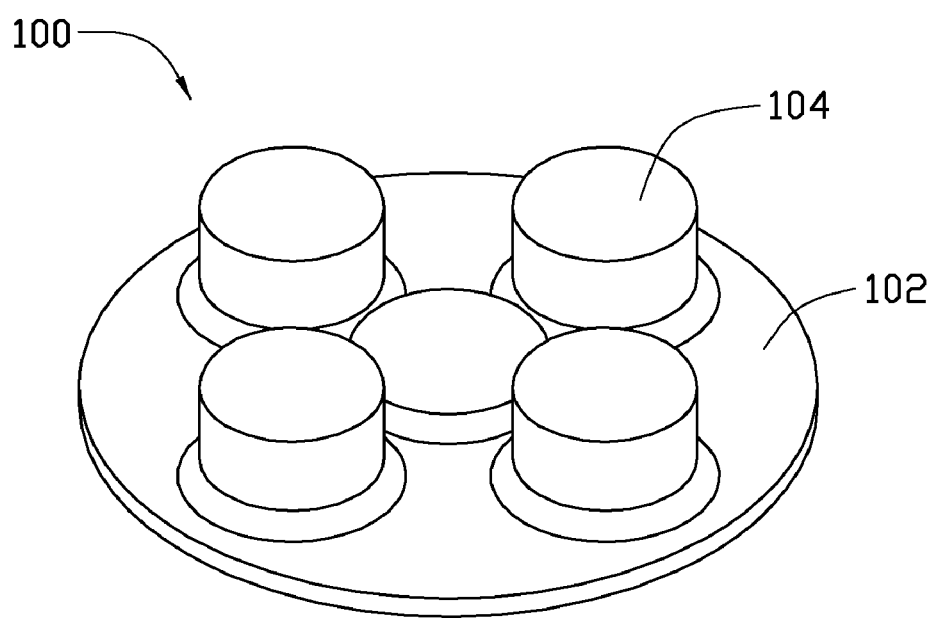
FIG. 4 is an obverse view of the keypad shown in FIG. 3.

Referring to FIGS. 3 and 4, the keypad 100 is made of resilient material, for example, rubber. The keypad 100 includes a base 102. The base 102 includes an obverse surface 1021 and a reverse surface 1022.

Figure 5:
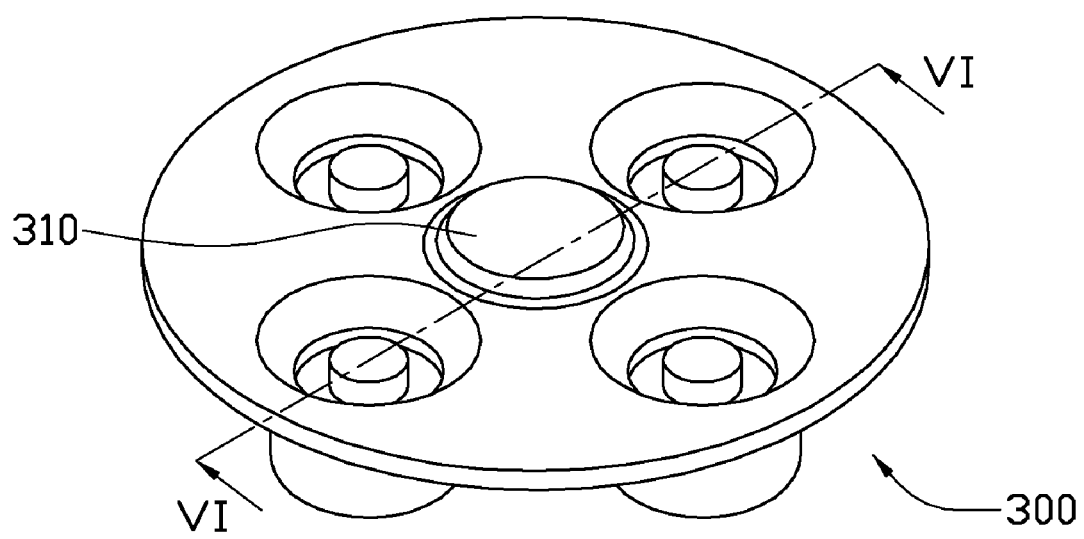
FIG. 5 is an reverse view of a keypad according to another exemplary embodiment.
Figure 6:
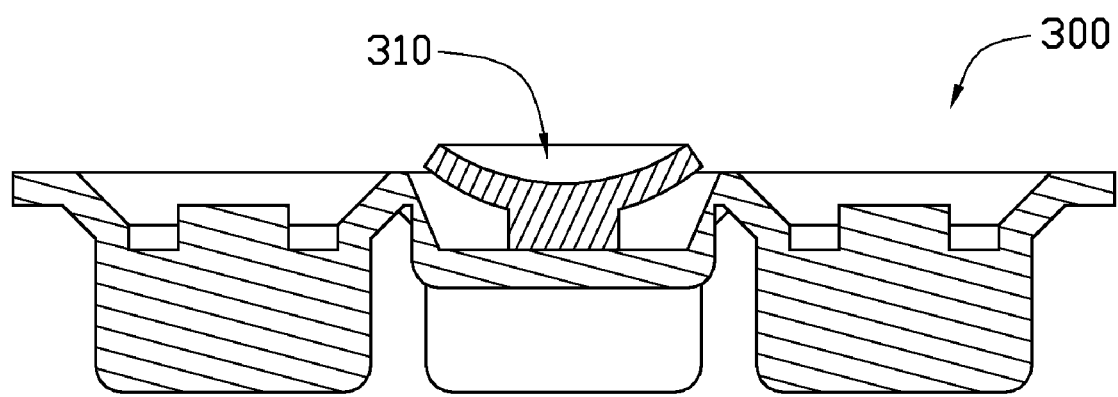
FIG. 6 is cross-sectional view of the keypad shown in FIG. 5 along the line VI-VI of FIG. 5.

Four protrusions 104 are protruded from the obverse surface 1021 and are distributed evenly. When pressed, the protrusions 104 are elastically deformed. Four hollow portions 106 are defined on the reverse surface 1022 corresponding to the four protrusions 104. A touching member 108 is set in each hollow portion 106, when the corresponding protrusion 104 is pressed, the touch member 108 is driven to press the touch screen 204. A groove 110 is defined on the reverse surface 1022 and surrounded by the hollow portions 106, and an attaching member 112 is received in the groove 110. The attaching member 112 is configured to deform and create suction to attach the keypad 100 on the touch screen 204, so that the keypad 100 is held on the touch screen 204 by suction and cannot slide easily in use. Referring to FIG. 3, the attaching member 112 is a magnet and is engaged with the receiving portion 206 made of metal material, accordingly, the keypad 100 is sucked on the touch screen 204. Referring to FIGS. 5 and 6, the attaching member 112 can also be a suction cup, thus the keypad 300 can also be attached on the touch screen 204 by suction cup.

With the electronic device 10 having a keypad 100 or 300, users can perform touch operations freely while touching the touching screen 204 directly, and can also use the keypad 100 or 300 on the touch screen 204 when speed is essential to control the operation, such as when playing a game.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. An electrical device, comprising:
   a body having a touch screen, the body comprising a receiving portion for holding the touch screen, the receiving portion being made of metal; and
   a keypad attached to the touch screen, comprising an obverse surface and a reverse surface, wherein at least one protrusion is protruded from the obverse surface and configured for receiving user input operation, the reverse surface defines a groove, a magnet is received in the groove and is configured to engage with the receiving portion to attach the keypad to the touch screen, at least one hollow portion is defined in the reserve surface corresponding to the at least one protrusion, and at least one pressing member is mounted in the at least one hollow portion and configured for touching the touch screen when the at least one protrusion is pressed.

2. The electrical device as described in claim 1, wherein when the at least one protrusion is pressed, the at least one protrusion is elastically deformed and drives the at least one touch member to press the touch screen.

3. The electrical device as described in claim 1, wherein the groove is surrounded by the at least one hollow portion.

4. An electrical device, comprising:
   a body having a touch screen; and
   a keypad attached to the touch screen, comprising an obverse surface and a reverse surface, wherein at least one protrusion is protruded from the obverse surface and configured for receiving user input operation, a suction cup is mounted on the reverse surface and is configured to deform and create suction to attach the keypad on the touch screen, at least one hollow portion is defined in the reserve surface corresponding to the at least one protrusion, and at least one pressing member is mounted in the at least one hollow portion and configured for touching the touch screen when the at least one protrusion is pressed.

5. The electrical device as described in claim 4, wherein when the at least one protrusion is pressed, the at least one protrusion is elastically deformed and drives the at least one touch member to press the touch screen.

6. The electrical device as described in claim 4, wherein the suction cup is surrounded by the at least one hollow portion.

7. A keypad, comprising:

an obverse surface and a reverse surface;

wherein at least one protrusion is protruded from the obverse surface and is configured for receiving user input operation, a suction cup is mounted on the reverse surface and configured to deform and create suction to attach the keypad on the touch screen, at least one hollow portion is defined in the reserve surface corresponding to the at least one protrusion, and at least one pressing member is mounted in the at least one hollow portion and configured for touching a touch screen when the at least one protrusion is pressed.

8. The electrical device as described in claim 7, wherein when the at least one protrusion is pressed, the at least one protrusion is elastically deformed and drives the at least one touch member to press the touch screen.

9. The electrical device as described in claim 7, wherein the suction cup is surrounded by the at least one hollow portion.

\* \* \* \* \*